United States Patent
Mayes

(10) Patent No.: US 6,396,237 B2
(45) Date of Patent: May 28, 2002

(54) POSITION DETECTION OF SWITCHED RELUCTANCE MACHINES

(75) Inventor: Peter Richard Mayes, Harrogate (GB)

(73) Assignee: Switched Reluctance Drives Limited, Harrogate (GB)

( * ) Notice: Subject to any disclaimer, the term of this patent is extended or adjusted under 35 U.S.C. 154(b) by 0 days.

(21) Appl. No.: 09/817,992

(22) Filed: Mar. 27, 2001

(30) Foreign Application Priority Data

Mar. 27, 2000 (GB) .............................................. 0007422

(51) Int. Cl.$^7$ ................................................. H02P 7/05
(52) U.S. Cl. ...................................... 318/701; 318/254
(58) Field of Search ................................ 318/254, 696, 318/701, 720, 721

(56) References Cited

U.S. PATENT DOCUMENTS

| | | | | |
|---|---|---|---|---|
| 4,772,839 A | * | 9/1988 | MacMinn et al. | 318/696 |
| 5,525,886 A | | 6/1996 | Lyons et al. | |
| 5,525,887 A | | 6/1996 | Van Sistine | |
| 5,783,916 A | * | 7/1998 | Blackburn | 318/254 |
| 5,859,518 A | * | 1/1999 | Vitunic | 318/701 |
| 6,291,949 B1 | * | 9/2001 | Green | 318/254 |
| 6,351,094 B1 | * | 2/2002 | Green | 318/701 |

FOREIGN PATENT DOCUMENTS

EP      0 573 198 A1     12/1993

OTHER PUBLICATIONS

Lyons, J.P. et al., "Flux/Current Methods for SRM Rotor Position Estimation," Conference Record of the 1991 IEEE Industry Applications Society Annual Meeting, vol. 1, Sep. 28, 1991, pp. 482–487.

Green, C.E.B. et al., "Sensorless Switched Reluctance Drive," Conference Publication No. 444, IEE 1997, pp. 64–68.

Suresh, G. et al., "Improvement of the Accuracy and Speed Range in Sensorless Control of Switched Reluctance Motors," APEC '98, vol. 2, Feb. 15–19, 1998, pp. 771–777.

Ehsani, M., et al, "Sensorless Control of Switched Reluctance Motors—A Technology Ready for Applications," BICEM'98, International Conference on Electrical Machines, Sep. 2–4, 1998, Istanbul, Turkey, vol. 2, pp. 673–684.

Stephenson, Dr. J.M., et al., "The Characteristics, Design and Applications of Switched Reluctance Motors and Drives," PCIM '93, Conference and Exhibiton, Seminar 5, 1993, Nünberg, Germany, pp. 1–68.

Ray, W.F., et al, "Sensorless Methods for Determining the Rotor Position of Switched Reluctance Motors," Proc EPE '93 Conference, Brighton, UK, Sep. 13–16, 1993, vol. 6, pp. 7–13.

Mvungi, N.H., et a, "A New Sensorless Position Detector for SR Drives," Proc PEVD Conference, IEE Pub'n No. 324, London, Jul. 17–19, 1990, pp. 249–252.

\* cited by examiner

*Primary Examiner*—Bentsu Ro
(74) *Attorney, Agent, or Firm*—Dicke, Billig & Czaja, P.A.

(57) ABSTRACT

A polyphase switched reluctance machine is controlled by a control system using sensorless position detection. The controller is robust and reliable and operates over the entire current chopping range of the machine. Diagnostic pulses of predetermined flux-linkage are injected into a phase, whether or not it has residual current flowing.

18 Claims, 8 Drawing Sheets

US 6,396,237 B2

POSITION DETECTION OF SWITCHED RELUCTANCE MACHINES

CROSS-REFERENCE TO RELATED APPLICATION

The subject matter of this application is related to the subject matter of British Application No. GB 0007422.9, filed Mar. 27, 2000, priority to which is claimed under 35 U.S.C. § 119 and which is incorporated herein by reference.

BACKGROUND OF THE INVENTION

1. Field of the Invention

The present invention relates to the control of switched reluctance machines, particularly those machines which are operated without a sensor to monitor rotor position.

2. Description of Related Art

In general, a reluctance machine is an electrical machine in which torque is produced by the tendency of its movable part to move into a position where the reluctance of a magnetic circuit is minimized, i.e. where the inductance of the exciting winding is maximized. Typically, circuitry is provided for detecting the angular position of the rotor and energizing the phase windings as a function of the rotor position. This type of reluctance machine is generally known as a switched reluctance machine and may be operated as a motor or a generator. The characteristics of such switched reluctance machines are well-known and are described in, for example, "The Characteristics, Design and Application of Switched Reluctance Motors and Drives" by Stephenson and Blake, PCIM '93, Nürnberg, Jun. 21–24, 1993, incorporated herein by reference. This paper describes in some detail the features of the switched reluctance machine which together produce the characteristic cyclically varying inductance of the phase windings.

FIG. 1 shows the principal components of a typical switched reluctance drive system. The input DC power supply 11 can be either a battery or rectified and filtered AC mains and can be fixed or variable in magnitude. In some known drives, the power supply 11 includes a resonant circuit which produces a DC voltage which rapidly varies between zero and a predetermined value to allow zero voltage switching of power switches. The DC voltage provided by the power supply 11 is switched across the phase windings 16 of the motor 12 by a power converter 13 under the control of the electronic control unit 14. The switching must be correctly synchronized to the angle of rotation of the rotor for proper operation of the drive. A rotor position detector 15 is traditionally employed to supply signals indicating the angular position of the rotor. The output of the rotor position detector 15 may also be used to generate a speed feedback signal.

The rotor position detector 15 may take many forms, for example it may take the form of hardware, as shown schematically in FIG. 1. In some systems, the rotor position detector 15 can comprise a rotor position transducer that provides output signals that change state each time the rotor rotates to a position where a different switching arrangement of the devices in the power converter 13 is required. In other systems, the position detector can be a software algorithm which calculates or estimates the position from other monitored parameters of the drive system. These systems are often called "sensorless position detector systems" since they do not use a physical transducer associated with the rotor. As is well known in the art, many different approaches have been adopted in the quest for a reliable sensorless system. Some of these approaches are discussed below.

The energization of the phase windings in a switched reluctance machine depends on detection of the angular position of the rotor. This may be explained by reference to FIGS. 2 and 3, which illustrate the switching of a reluctance machine operating as a motor. FIG. 2 generally shows a rotor pole 20 of a rotor 24 approaching a stator pole 21 of stator 25 according to arrow 22. As illustrated in FIG. 2, a portion 23 of a complete phase winding 16 is wound around the stator pole 21. When the portion 23 of the phase winding 16 around stator pole 21 is energized, a force will be exerted on the rotor, tending to pull rotor pole 20 into alignment with stator pole 21. FIG. 3 generally shows typical switching circuitry in the power converter 13 that controls the energization of the phase winding 16, including the portion 23 around stator pole 21. When switches 31 and 32 are closed, the phase winding is coupled to the source of DC power and is energized. Many other configurations of lamination geometry, winding topology and switching circuitry are known in the art: some of these are discussed in the Stephenson & Blake paper cited above. When the phase winding of a switched reluctance machine is energized in the manner described above, the magnetic field set up by the flux in the magnetic circuit gives rise to the circumferential forces which, as described, act to pull the rotor poles into line with the stator poles.

In general, the phase winding is energized to effect the rotation of the rotor as follows. At a first angular position of the rotor (called the "turn-on angle", $\theta_{on}$), the controller 14 provides switching signals to turn on both switching devices 31 and 32. When the switching devices 31 and 32 are on, the phase winding is coupled to the DC bus, causing an increasing magnetic flux to be established in the machine. The magnetic flux produces a magnetic field in the air gap which acts on the rotor poles to produce the motoring torque. The magnetic flux in the machine is supported by the magneto-motive force (mmf) which is provided by a current flowing from the DC supply through the switches 31 and 32 and the phase winding 23. Current feedback is generally employed and the magnitude of the phase: current is controlled by chopping the current by rapidly switching one or both of switching devices 31 and/or 32 on and off FIG. 4(a) shows a typical current waveform in the chopping mode of operation, where the current is chopped between two fixed levels. In motoring operation, the turn-on angle $\theta_{on}$ is often chosen to be the rotor position where the center-line of an inter-polar space on the rotor is aligned with the center-line of a stator pole, but may be some other angle.

In many systems, the phase winding remains connected to the DC bus (or connected intermittently if chopping is employed) until the rotor rotates such that it reaches what is referred to as the "freewheeling angle", $\theta_{fw}$. When the rotor reaches an angular position corresponding to the freewheeling angle (e.g., the position shown in FIG. 2) one of the switches, for example 31, is turned off. Consequently, the current flowing through the phase winding will continue to flow, but will now flow through only one of the switches (in this example 32) and through only one of the diodes 33/34 (in this example 34).

During the freewheeling period, the voltage drop across the phase winding is small, and the flux remains substantially constant. The circuit remains in this freewheeling condition until the rotor rotates to an angular position known as the "turn-off angle", $\theta_{off}$, (e.g. when the center-line of the rotor pole is aligned with that of the stator pole). When the rotor reaches the turn-off angle, both switches 31 and 32 are turned off and the current in phase winding 23 begins to flow through diodes 33 and 34. The diodes 33 and 34 then apply the DC voltage from the DC bus in the opposite sense, causing the magnetic flux in the machine (and therefore the phase current) to decrease. It is known in the art to use other switching angles and other current control regimes.

As the speed of the machine rises, there is less time for the current to rise to the chopping level, and the drive is normally run in a "single-pulse" mode of operation. In this mode, the turn-on, freewheel and turn-off angles are chosen as a function of, for example, speed and load torque. Some systems do not use an angular period of freewheeling, i.e. switches 31 and 32 are switched on and off simultaneously. FIG. 4(b) shows a typical such single-pulse current waveform where the freewheel angle is zero. It is well-known that the values of turn-on, freewheel and turn-off angles can be predetermined and stored in some suitable format for retrieval by the control system as required, or can be calculated or deduced in real time.

It will be realized that sensorless systems have to be capable of providing rotor position signals in both chopping and single-pulse operating modes if the full capabilities of the switched reluctance machine are to be realized. Though many sensorless systems have been developed, the majority have been limited to either one mode of operation or have imposed severe restrictions on the operation of the system. One proposal has been to use diagnostic pulses injected into a phase winding which is not being used at that moment for production of torque and which has no current flowing in it (i.e. an "idle" phase). Typically this approach is applicable to the chopping mode, where the rise and fall times of the current are relatively short compared to the overall excitation cycle. One implementation of this approach is described in "A New Sensorless Position Detector for SR Drives" by Mvungi et al, Proc PEVD Conf, IEE Pub'n No 324, London, Jul. 17–19, 1990, pp 249–252, incorporated herein by reference. This paper concedes that a different approach is required for high-speed (i.e. single-pulse) operation. One such approach is exemplified by EP-A-0573198 (Ray), incorporated herein by reference, which discloses a method of flux. and current measurement leading to predictions of rotor position. Many other sensorless position detection systems are reviewed and categorized in "Sensorless Methods for Determining the Rotor Position of Switched Reluctance Motors", Ray et al, Proc EPE'93 Conference, Brighton, UK, Sep. 13–16, 93, Vol 6, pp 7–13, incorporated herein by reference, which concludes that none of these methods is entirely satisfactory for operation over the entire operating range.

The method proposed by Mvungi could be made to work at very low speeds where the idle period is relatively long and the fall times of the currents are short, giving sufficient time to inject several diagnostic pulses. The method, however, depends on the flux and current decaying to zero before diagnostic pulses are injected (Mvungi, Page 252, Col. 2). This requirement becomes more difficult to fulfil as the speed rises, since the tail current of the main excitation takes longer to decay and the space for diagnostic pulses becomes smaller and smaller. Mvungi describes his system using a 4-phase machine, but the problem becomes more acute on a 3-phase system (which is often preferred for other reasons). FIG. 5(a) shows the phase current waveform with pulses of flux-linkage injected as described by Mvungi. The pulses are injected only after the tail current of the main excitation has decayed to zero. The increasing current of the pulses is an indication of the decreasing inductance of that phase winding as the rotor moves. (It should be noted that the size of the pulses has been exaggerated for clarity.) FIG. 5(a) is drawn for an operating point at very low speed, where the tail current quickly decays to zero, leaving a suitably long region for diagnosis of rotor position.

However, as the speed rises, the tail current takes longer and longer to decay, encroaching into the diagnostic region and delaying the opportunity to inject the diagnostic pulses. This is shown in FIG. 5(b). As the speed rises, the time remaining for diagnosis becomes inadequate to inject sufficient pulses for a reliable estimate of position, and the system becomes unstable because there are times when none of the phases is in a condition for diagnosis and synchronism of the control system with rotor position is lost.

Thus, at low speeds the Mvungi method is available and at high speeds the Ray method is available. However, there is a region between them where there is a need for a technique of rotor position detection that allows robust operation of the drive.

It has previously been held that, because the permeance of reluctance machines is non-linear with current, since the B-H curve of the lamination steel is not linear, superposition of currents will not give accurate results. Thus it has always been held; that diagnostic pulses for rotor position detection can only be injected when there is no current flowing in the phase winding, otherwise the results will be erroneous. This is referred to by, for example, Ehsani, M, Rajarathnam, AV, Suresh, G, & Fahimi, in "Sensorless control of switched reluctance motors—a technology ready for applications", BICEM'98, International Conference on Electrical Machines, Sep. 2–4, 1998, Istanbul, Turkey, Vol 2, pp 673–684, incorporated herein by reference. In general this is true, but the inventor of the present invention has realized that there is a part of the inductance cycle of the machine where this general statement is not true.

SUMMARY OF THE INVENTION

Embodiments of the invention provide a reliable and economic sensorless position detection method for a switched reluctance drive which can operate over all conditions of speed (including zero speed) and load (including transient load disturbances), particularly over those speeds near the transition point between chopping and single-pulse modes. Embodiments of the invention are generally applicable to switched reluctance machines operating as motors or generators.

Embodiments of the invention further provide position detection suitable for starting the machine from rest and for operating over a fill chopping range.

According to embodiments of the invention there is provided a method of determining rotor position in a switched reluctance machine comprising a rotor, a stator and at least one phase winding, the method comprising: measuring one of the main current and flux-linkage in the phase winding during an inactive period in which the phase is not energized; injecting a diagnostic pulse having a predetermined value of current or flux-linkage into the inactive phase winding; measuring the total current or flux-linkage in the phase at the end of the pulse; producing a value for the current or flux-linkage due to injection of the diagnostic pulse from the difference between the total and the main current or flux-linkage; and deriving the rotor position from a correlation of the current or flux-linkage with rotor angle for a value of the other of current and flux-linkage.

Preferably, the diagnostic pulse is of predetermined flux-linkage. Preferably, the pulse is injected when the current has decayed to a range in which the inductance is linear with current.

Pulses can be injected repeatedly in the same phase period. Each time a detection is made it can be compared with a predicted value computed according to the machine speed. If the variation between the derivation and the prediction is too great, or too great over a number of cycles, the machine control can be modified, e.g. shut down.

Embodiments of the invention also extend to a detector for a switched reluctance drive comprising a machine having a rotor, a stator, at least one phase winding and switch means actuatable for energizing the phase windings, the rotor position detector comprising: measuring means for measuring one of the main current and flux-linkage in the phase; means for causing the measuring means to measure the main current or flux-linkage during an inactive period: in which the phase is not energized; injection means for injecting a diagnostic pulse, having a predetermined value of the one of current and flux-linkage, into the inactive phase; means for causing the measuring means to measure the current or flux-linkage in the phase at the end of the pulse; means for producing a value of the current or flux-linkage due to injection of the diagnostic pulse from the difference between the total and the main current or flux-linkage; and means for deriving the rotor position from a correlation of current or flux-linkage with rotor angle for a value of the other of the current and flux-linkage.

Embodiments of the invention further extend to a computer program element comprising computer program code means to make the computer execute the method according to the invention.

BRIEF DESCRIPTION OF THE DRAWINGS

The invention can be put into practice in a number of ways, some of which will now be described by way of example, with reference to the accompanying drawings in which.

DETAILED DESCRIPTION OF PREFERRED EMBODIMENTS

Figure 7:
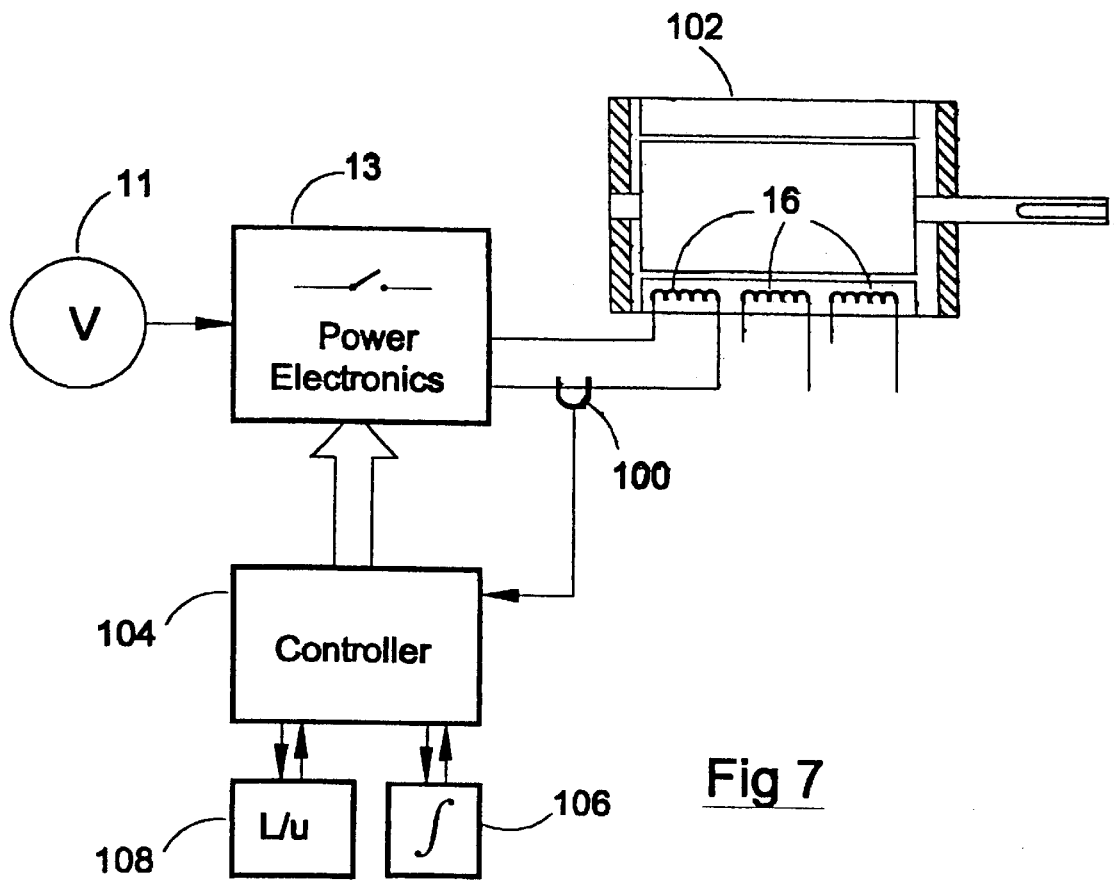
FIG. 7 is a schematic block diagram of a switched reluctance drive, according to an embodiment of the invention.

FIG. 7 shows a schematic diagram of a system according to an embodiment of the invention. While the components are shown as discrete blocks, various of the functions could equally well be executed in software by a single processor or ASIC programmed for the task as part of the overall control of a switched reluctance machine.

Figure 1:
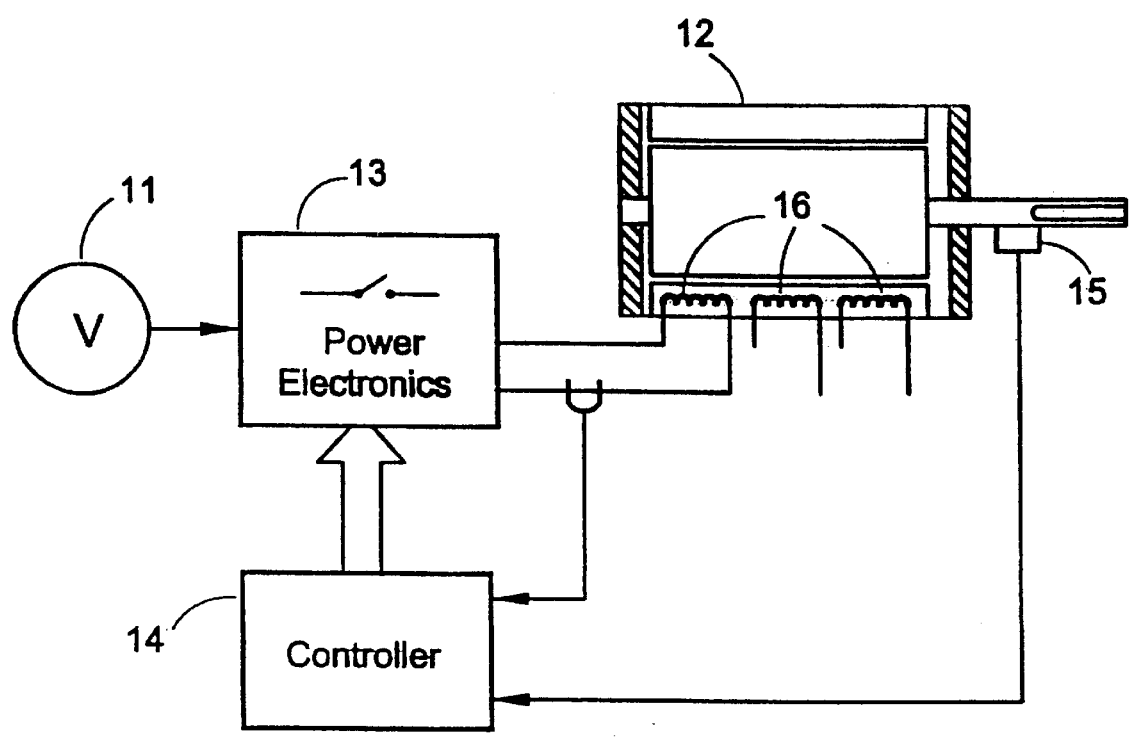
FIG. 1 shows the principal components of a switched reluctance drive system.
Figure 2:
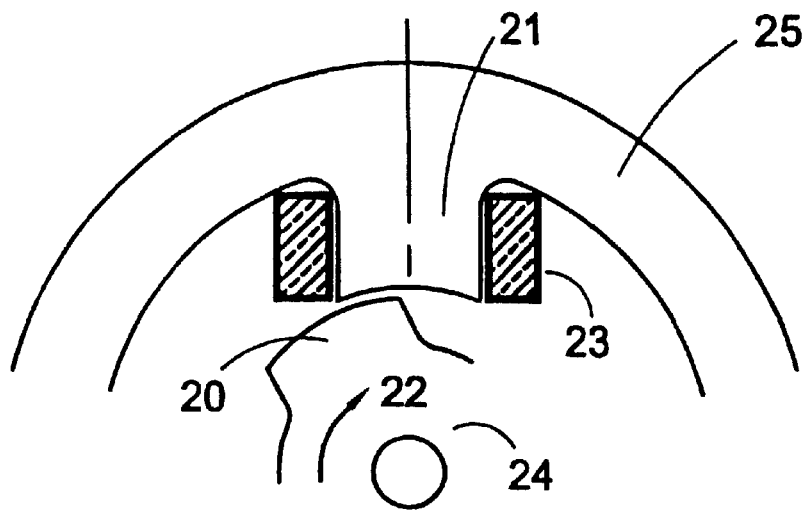
FIG. 2 shows a schematic diagram of a rotor pole approaching a stator pole.
Figure 3:
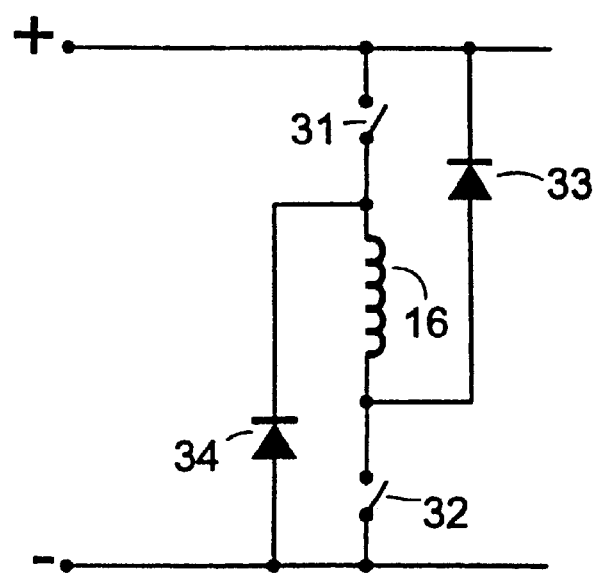
FIG. 3 shows typical switching circuitry in a power converter that controls the energization of the phase windings of the machine of FIG. 1.
Figure 4A:
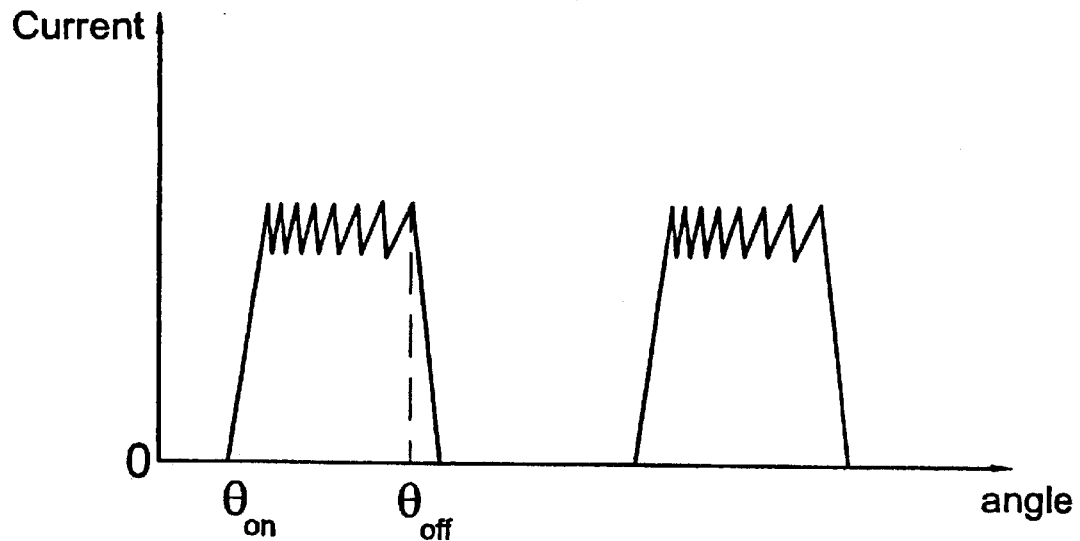
FIGS. 4(a) and 4(b) illustrate typical current waveforms of a switched reluctance drive operating in chopping and single-pulse modes respectively.
Figure 4B:
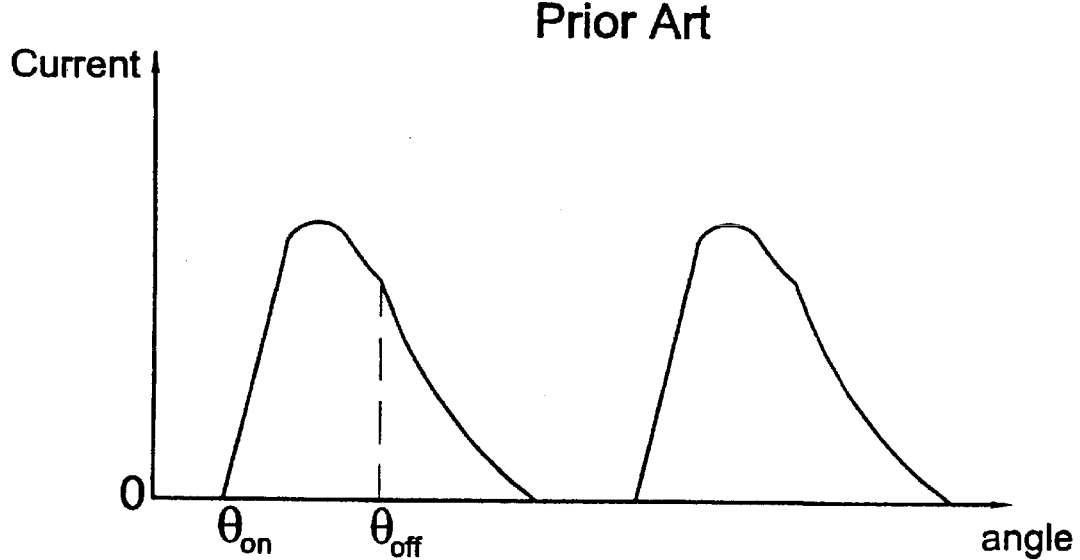
Figure 5A:
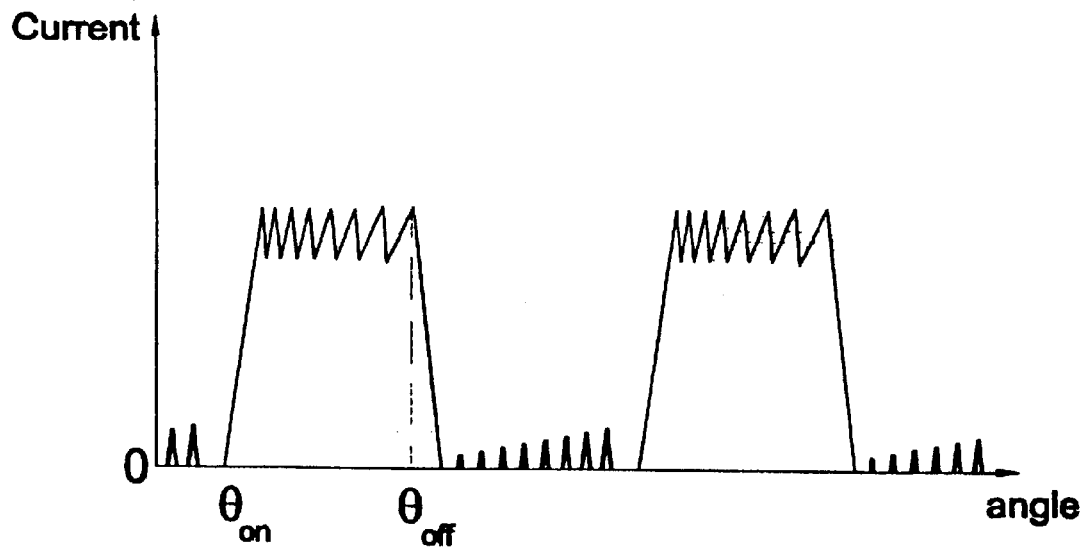
FIGS. 5(a) and 5(b) show phase current waveforms resulting from the excitation of a switched reluctance drive.
Figure 5B:
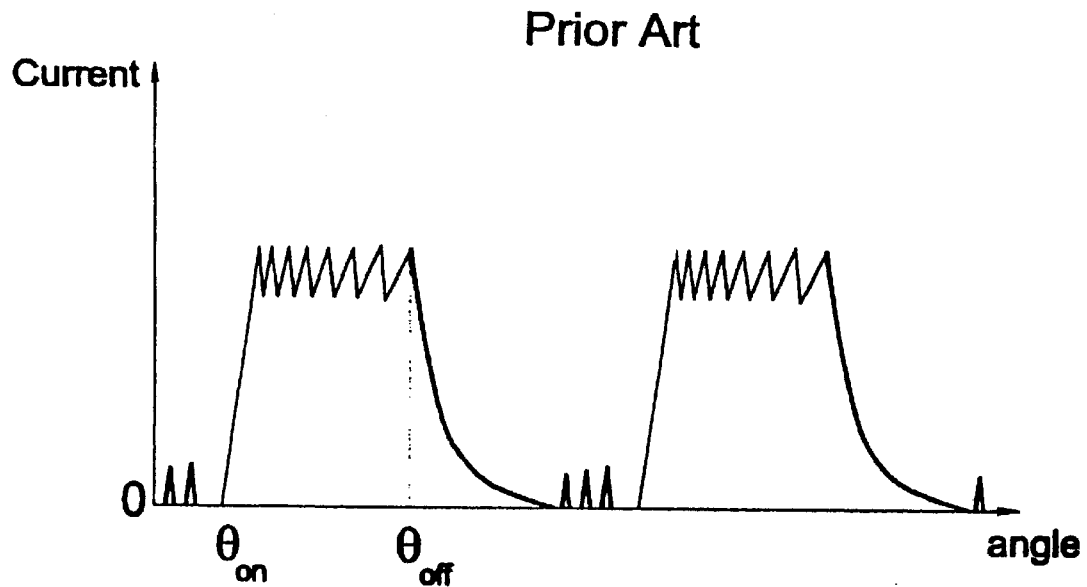

A current transducer 100 is arranged to provide signals indicative of the phase current for each phase of the motor 102 (only one transducer for one phase is shown for clarity). As in FIG. 1, three phases are shown. The number of phases could be more or less than this. The signals are supplied to a microprocessor-based controller 104. Again, the arrangement is similar to that in FIG. 1. The current transducer 100 can be of any appropriate type, e.g. an isolated system such as a Hall-effect device, a Rogowski coil, etc. Alternatively a non-isolated system, such as a thermally stable resistor, as commonly used in a low cost drive systems, could be used.

The controller is shown as having an output to an integrator 106, although this is one of the functions that could equally well be performed in software. A look-up table 108 is also arranged to be accessed by the controller 104. The, look-up table stores values of phase current against rotor angle from which the rotor position information is retrieved or interpolated.

Embodiments of the invention incorporate the technique of injecting diagnostic pulses into a phase by closing the switch or switches in power converter 13 in order to apply a voltage across the winding. This causes a growth in the flux-linkage. When the flux-linkage has reached a predetermined level, the switches are opened again. It will be appreciated by the skilled person that flux-linkage is the time integral of the voltage across the winding.

Figure 8:
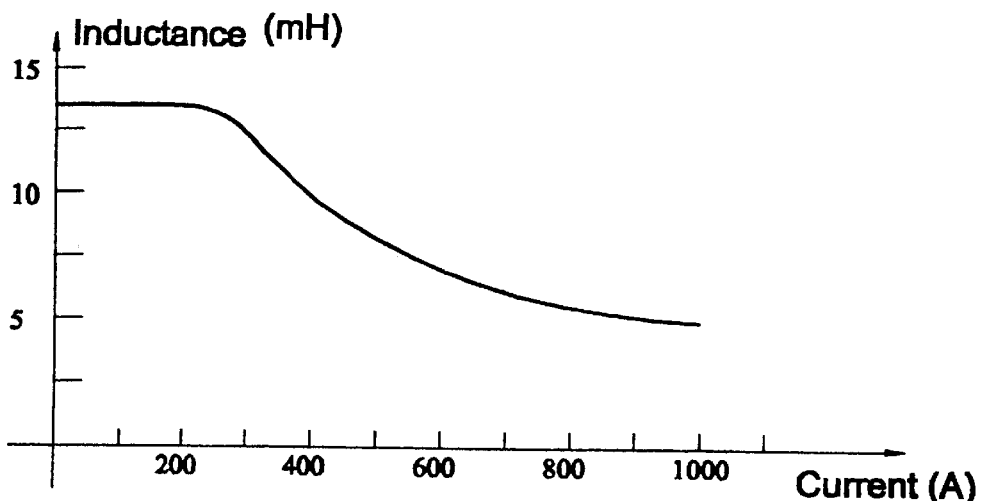
FIG. 8 shows a phase current/inductance characteristic of a switched reluctance machine, according to an embodiment of the invention.

The relevant part of the cycle exploited by embodiments of the present invention falls around the minimum inductance region. This is shown in FIG. 8, where the inductance of the phase winding of a typical switched reluctance machine in its unaligned position (i.e. the position of the rotor pole for a given phase and relative to adjacent stator poles at which there is minimum inductance) is plotted as a function of current. It is seen that there is a significant flat portion in the curve (from zero to about 200A in this example), indicating that the inductance is independent of current over that range, i.e. in this range the incremental inductance equals the inductance.

According to embodiments of the invention, diagnostic pulses are injected into an inactive phase but while there still may be current present in the winding. The pulses are of fixed flux-linkage, but of fixed or variable frequency, depending on the variant of the method used. The pulse is applied to the inactive phase by actuating the power electronic switches for that phase after the end of the conduction angle at $\theta_{OFF}$. When the flux-linkage of the pulse reaches the predetermined value, as determined by the output of the integrator 106, the current in the inactive phase is recorded and the switches are turned off. From the look-up table 108 of current for this fixed flux-linkage, the rotor position can be read off When current associated with the diagnostic pulse has decayed to zero leaving only the main current, a subsequent pulse can be initiated and the process repeated in the same diagnostic period. The repetition rate of the pulses is a matter of choice for the designer of the system: the pulses can be injected at a fixed frequency or a new pulse can be initiated as soon as the measurement of the previous one is complete and the circuit is ready to begin a new measurement.

For motoring operation, the pulses are positioned in the falling inductance region. For generating operation, the pulses are positioned in the rising inductance region. Provided that the inductance profile of the machine is symmetrical, only one set of data of rotor position against current need be stored in the look-up table since a simple reflection about the maximum or minimum inductance angle will give the correct position for either mode.

Figure 6:
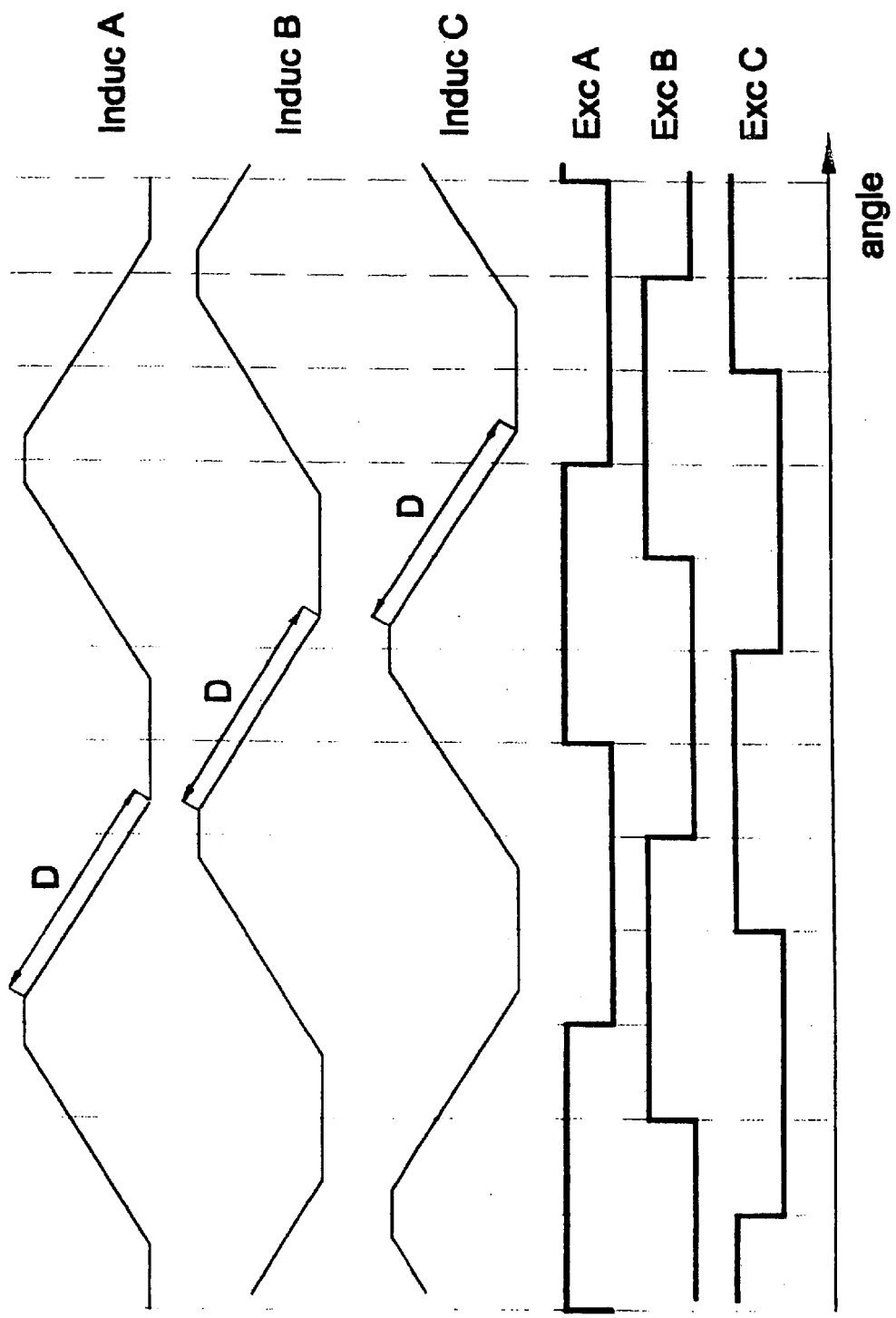
FIG. 6 shows the idealized inductance profiles, excitation regions and diagnostic regions of a machine operated in low-speed mode, according to an embodiment of the invention.

The injection of diagnostic pulses is shown graphically in FIG. 6, where Induc A, Induc B and Induc C denote the idealized inductance profiles of a 3-phase machine, Exc A, Exc B and Exc C denote the excitation angles for motoring operation and the regions D denote the rotor angles over which the phases are inactive and may be used to diagnose the rotor position generally. Since there is always one phase which is not energized, there is always a region available in which the diagnostic pulses may be positioned according to embodiments of the invention. Note that it is also possible to use a pulse of fixed current height and read the flux-linkage associated with it to read off position from a position vs. flux-linkage table. However, the length of time taken by the current to reach the required level will vary significantly over the angular region in which diagnosis takes place. This leads to irregularly spaced pulses. Further, if two phases were to be diagnosed together the pulses would reach their peak at different times. With pulses of fixed flux-linkage however, these problems do not exist.

Figure 9:
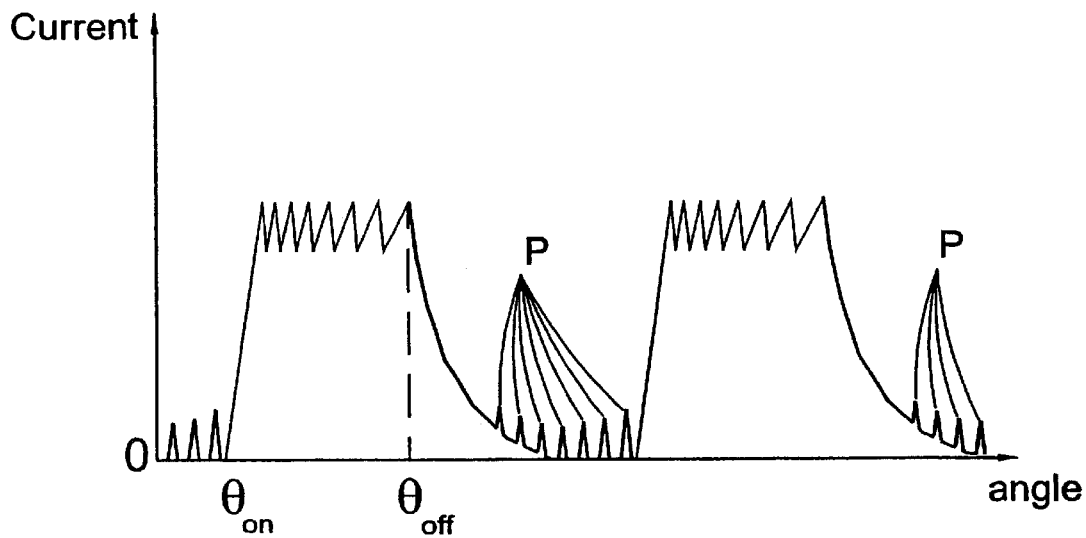
FIG. 9 is a phase current waveform according to an embodiment of the invention.

The significance of embodiments of the present invention is that, when the conduction angle is completed, it is possible to use the phase for diagnosis whether or not current is flowing in it, since the inductance is linear and the principle of superposition will apply. Thus, using suitable methods of measuring the current and inductance or flux-linkage, the diagnostic pulses can be reliably inserted in this region. FIG. 9 shows the phase current waveform using this principle in which diagnostic pulses P are injected after the switch-off angle $\theta_{off}$ and before the next switch-on angle $\theta_{on}$. It will be noted that the current is high at the point of switch-off. It initially falls rapidly with angle to the linear region in FIG. 8, allowing diagnostic pulses to be injected after the current reaches this level.

Figure 10:
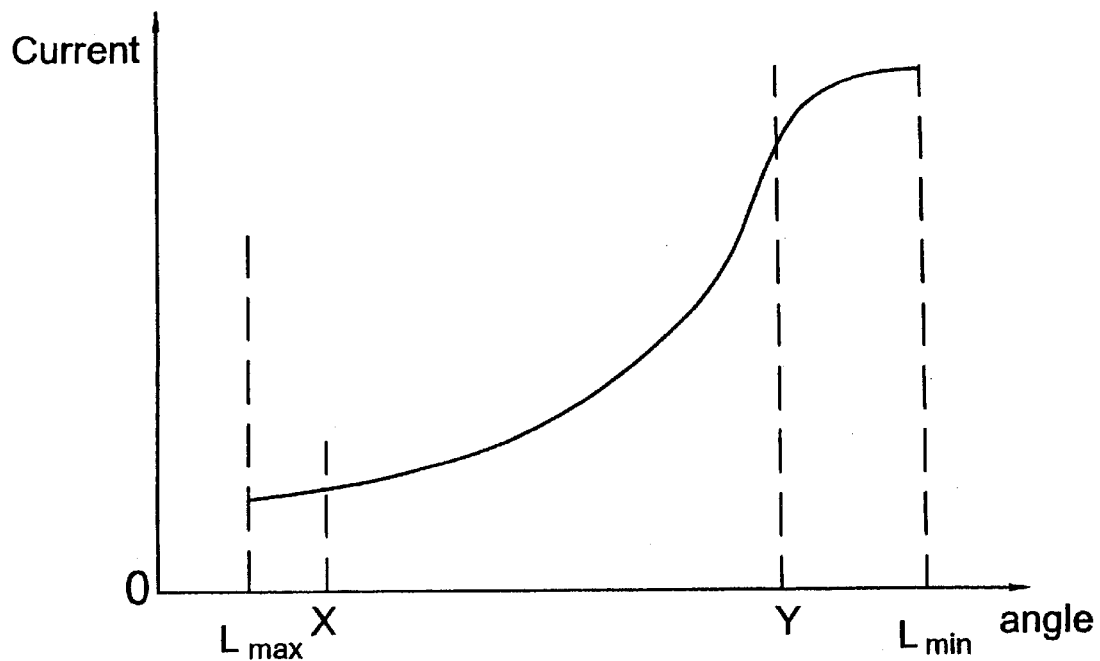
FIG. 10 shows a rotor angle/current characteristic of a switched reluctance machine.

FIG. 10 shows the curve of current with angle for constant flux-linkage for a typical machine. Knowledge of this curve allows rotor position to be determined when the current corresponding to the constant flux-linkage is known. It will be realized, however, that simply reading the current for, say, the first diagnostic pulse after switch-off in FIG. 9 and reading position from FIG. 10 will give an incorrect result, e.g. position Y, because the current due to the pulse is superimposed on the main tail current. Embodiments of the invention recognize that the principle of superposition applies at these current levels at which the inductance is linear. By subtracting the main current (that would exist absent the current due to the diagnostic pulse) to give an incremental current due to the pulse alone, the correct position can be read from FIG. 10, e.g. position X.

Sensorless position detection systems generally have to operate in electrically noisy environments close to power switching devices, and this often leads to corruption of the measurements of flux-linkage and current, leading to the calculation of spurious positional data. In order to improve the robustness of the system, a suitable method of checking the validity of the calculated positional data can be added. For example, each time a new position is calculated, the values of position, time and speed can be stored. Using the last n stored values, a predicted position can be extrapolated for comparison with the newly calculated one. If the newly calculated and predicted values do not agree within a predetermined amount, an error count is incremented and the predicted value used in place of the calculated one: if they do agree, any existing error count is decremented and the calculated value is used. Hence, over successive cycles of measurement, data is built up on the reliability of the positional information. If the error count exceeds a certain value representative of, say, 5 consecutive calculations not agreeing, the control system can decide that it has lost synchronism with the real position of the rotor and shut down excitation of the machine before any more serious event occurs. The storage and extrapolation of the values can be done by any convenient means but typically by digital storage in memory locations. It has been found that using n=8 gives a good compromise between system stability and storage space.

Figure 11:
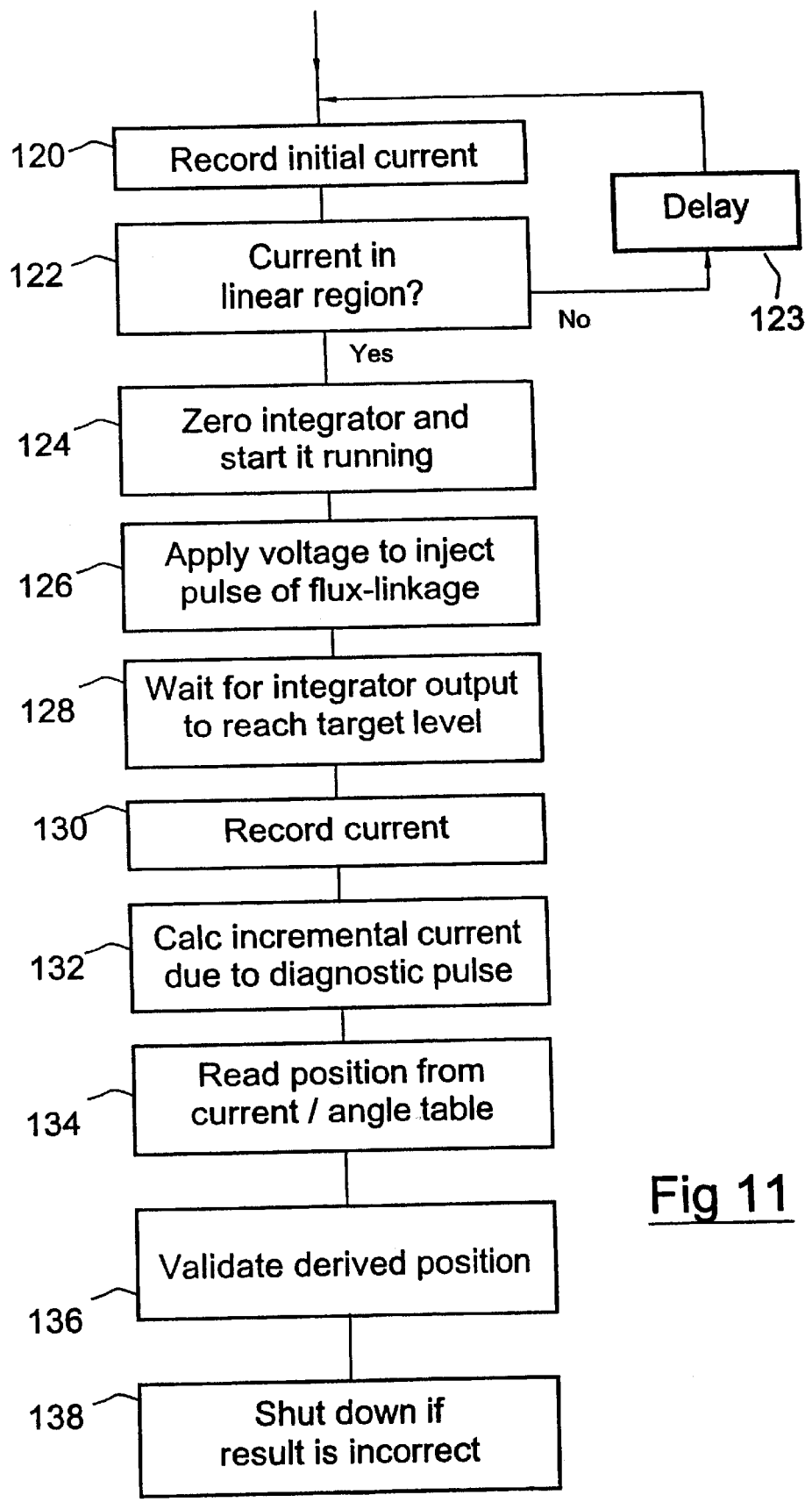
FIG. 11 is a flow chart according to an embodiment of the invention.

The method of finding rotor position information can be implemented in any convenient way but typically in the software of a computer device, such as a microprocessor or a digital signal processor. FIG. 11 shows a flowchart describing appropriate code. It is a matter of routine for the person skilled in the art to produce code suitable for a particular processing device when given the benefit of the description of the invention and the flowchart of FIG. 1. The code is stored in memory which is a form of computer program element. The steps of the flowchart will now be described.

In box 120 the phase current is measured and recorded after the turn-off angle $\theta_{off}$. The measurement can be by any convenient method, typically by making use of the current transducer 100 provided for overall current control of the phase winding. The value is stored in a register in the processor of the controller 104. In box 122 if the current is in the region in which the inductance is linear, the rotor position detection process proceeds. If not, box 123 executes a delay before re-initiating the process.

In box 124 the voltage integrator 106 is reset to zero by the controller and released to run to integrate the voltage across the inactive phase into which the diagnostic pulse is to be injected. Integration can be by analog hardware or digital software techniques.

In box 126 the power switch(es) of the power converter 13, corresponding to the inactive phase in which the diagnosis is to take place, are closed to apply the DC link voltage to the phase, thus applying a positive voltage to increase the flux-linkage of the phase.

In box 128 the processor waits until the output of the integrator reaches a predetermined value corresponding to the predetermined flux-linkage of the diagnostic pulse to which the curve of FIG. 10 stored in the look-up table 108 refers.

When the required level of flux-linkage is reached, the controller takes a reading from the current transducer 100 and the current level is recorded, as indicated in box 130. In box 132, the first value of current which was measured at the start of the pulse (as stored in box 110) is subtracted from this second current value. Subtracting the main current from the total current provides the incremental current due to the pulse alone.

It will be realized that this technique depends on the main current being constant, or nearly so, during the diagnostic pulse. In practice, the pulse is short and the change in current is so small that the error introduced into the calculation is small enough to be tolerable. In any case, the error greatly reduces after the first few pulses following switch-off. If for any reason the diagnostic pulse needs to be larger, thus taking longer to reach the required flux-linkage, a correction can be introduced by calculating what the main current would have been at the peak of the pulse, and using that value for the calculation of current due to the pulse. The calculation can be based on, e.g., a knowledge of the slope of the current immediately prior to the start of the pulse.

In box 134 the incremental current is used to read the rotor position from the current/angle look-up table shown in FIG. 10. The data of this curve can be stored in any convenient form, e.g. as values of rotor angle at fixed increments of current. Interpolation (e.g. linear, quadratic or polynomial) can be used to provide results for points intermediate to those stored.

In box 136 the derived rotor position is compared with a predicted value taken from the information on previous rotor position and speed available to the controller 104. In box 138 the machine is shut down if the comparison is outside a given range for the required number of times. The routine can then be repeated to find the next rotor position using the same inactive phase or the next available inactive phase. Each reading of rotor position derived in this way is then available for use in controlling the machine as a motor or a generator in the conventional way.

Embodiments of the present invention can be used in place of the diagnostic pulse technique discussed previously. Embodiments of the invention exploit the recognition that there is a non-zero range of current in which the inductance is substantially independent of the current. The existence of a tail current in the diagnostic period requires subtraction of the initial measurement of tail current, as described. When there is no current present, the routine followed in accordance with this invention will simply subtract nothing from the reading of current at the end of the diagnostic period.

It will be realized that, while the above examples have been described in relation to a three-phase machine, the invention can be applied to any switched reluctance machine with any number of poles and phases. Similarly, the invention could be applied to a linear machine where the moving part (often referred to as a "rotor") travels linearly. Thus, the skilled person will appreciate that variation of the disclosed arrangements is possible without departing from the invention. Accordingly, the above description of several embodiments is made by way of example and not for the purposes of limitation. The present invention is intended to be limited only by the following claims.

What is claimed is:

1. A method of determining rotor position in a switched reluctance machine comprising a rotor, a stator and at least one phase winding, the method comprising:
   measuring one of main current and flux-linkage in the phase winding during an inactive period in which the phase is not energized;
   injecting a diagnostic pulse having a predetermined maximum value of current or flux-linkage into the inactive phase winding;
   measuring total current or flux-linkage in the phase at the end of the pulse;
   producing a value for the current or flux-linkage due to injection of the diagnostic pulse from the difference between the total current and the main current or flux-linkage; and
   deriving rotor position from a correlation of the current or flux-linkage with rotor angle for a value of the other of current and flux-linkage.

2. A method as claimed in claim 1 in which the diagnostic pulse is injected when phase current has fallen below a predetermined value to a range in which inductance is substantially independent of current.

3. A method as claimed in claim 1 in which the pulse is of predetermined flux-linkage and is measured by integrating voltage across the phase winding.

4. A method as claimed in claim 1 in which the diagnostic pulse is injected by switching; a supply voltage across the phase winding.

5. A method as claimed in claim 1 including:
   comparing the derived rotor position with a predicted value of rotor position; and
   selecting between the derived and predicted values as the determined rotor position.

6. A method as claimed in claim 5 including selecting the predicted value of rotor position if the derived rotor position differs from the predicted rotor position by a predetermined amount.

7. A method as claimed in claim 5 including modifying control of the machine if the error between the derived rotor position and the predicted rotor position differs by a second predetermined amount for a number of successive determinations of rotor position.

8. A method as claimed in claim 1 including comparing measured main current with a predetermined value corresponding to a region of linear inductance and proceeding with the method if the main current is below the predetermined value.

9. A computer program element comprising computer program code means to make a computer execute the method as claimed in claim 1.

10. A method of determining rotor position in a switched reluctance machine comprising a rotor, a stator and at least one phase winding, the method comprising:
    measuring one of main current and flux-linkage in the phase winding during an inactive period in which the phase is not energized;
    injecting a diagnostic pulse having a predetermined maximum value of current or flux-linkage into the inactive phase winding, the diagnostic pulse being injected when phase current has fallen below a predetermined value to a range in which inductance is substantially independent of current, the diagnostic pulse being of predetermined flux-linkage and being measured by integrating voltage across the phase winding;
    measuring total current or flux-linkage in the phase at the end of the pulse;
    producing a value for the current or flux-linkage due to injection of the diagnostic pulse from the difference between the total current and the main current or flux-linkage;
    deriving rotor position from a correlation of the current or flux-linkage with rotor angle for a value of the other of current and flux-linkage;
    comparing, the derived rotor position with a predicted value of rotor position; and
    selecting between the derived and predicted values as the determined rotor position.

11. A rotor position detector for a switched reluctance drive comprising a machine having a rotor, a stator, at least one phase winding and switch means actuatable for energizing the at least one phase winding, the rotor position detector comprising:
    means for measuring one of main current and flux-linkage in the phase;
    means for causing the means for measuring to measure main current or flux-linkage during an inactive period in which the phase is not energized;
    means for injecting a diagnostic pulse, having a predetermined value of the one of current and flux-linkage, into the inactive phase;

means for causing the means for measuring to measure the total current or flux-linkage in the phase at the end of the pulse;

means for producing a value of current or flux-linkage due to injection of the diagnostic pulse from the difference between the total current and the main current or flux-linkage; and means for deriving rotor position from a correlation of current or flux-linkage with rotor angle for a value of the other of the current and flux-linkage.

12. A detector as claimed in claim 11 including means for monitoring phase current and for causing the means for injecting to inject the diagnostic pulse when the phase current has fallen below a predetermined value to a range in which inductance is substantially independent of current.

13. A detector as claimed in claim 11 in which the pulse is of predetermined flux-linkage, the detector including an integrator arranged to integrate voltage across the phase to measure the flux-linkage.

14. A detector as claimed in claim 11 in which the means for injecting comprises the switch means of the switched reluctance drive.

15. A detector as claimed in claim 11 including means for comparing the derived rotor position with a predicted value of rotor position and means for selecting between the derived and predicted values.

16. A detector as claimed in claim 15 in which the means for selecting is operable to select between the derived and predicted values if the derived value differs from the predicted value by a predetermined amount.

17. A detector as claimed in claim 15 in which the means for selecting is operable to select between the derived and predicted values if the derived value differs from the predicted value by a predetermined amount for a number of successive derivations of rotor position.

18. A rotor position detector for a switched reluctance drive comprising a machine having a rotor, a stator, at least one phase winding and at least one switch actuatable for energizing the at least one phase winding, the rotor position detector measuring one of main current and flux-linkage in the phase during an inactive period in which the phase is not energized, injecting a diagnostic pulse into the inactive phase, the pulse having a predetermined value of the one of current and flux-linkage, measuring the total current or flux-linkage in the phase at the end of the pulse, producing a value of current or flux-linkage due to injection of the diagnostic pulse from the difference between the total current and the main current or flux-linkage, and deriving rotor position from a correlation of current or flux-linkage with rotor angle for a value of the other of the current and flux-linkage.

* * * * *

UNITED STATES PATENT AND TRADEMARK OFFICE
CERTIFICATE OF CORRECTION

PATENT NO. : 6,396,237 B2
DATED : May 28, 2002
INVENTOR(S) : Peter R. Mayes

It is certified that error appears in the above-identified patent and that said Letters Patent is hereby corrected as shown below:

Column 2,
Line 41, "off FIG" has been changed to -- off. FIG --.

Column 4,
Line 22, "held; that" has been changed to -- held that --.
Line 27, paragraph break has been removed.
Line 48, "fill" has been changed to -- full --.

Column 5,
Line 6, "e g." has been changed to -- e.g. --.

Column 6,
Line 19, "The," has been changed to -- The --.
Line 56, "off When" has been changed to -- off. When --.

Column 7,
Line 41, "when. the" has been changed to -- when the --.

Column 10,
Line 2, "switching; a" has been changed to -- switching a --.

Signed and Sealed this

Twenty-third Day of July, 2002

Attest:

Attesting Officer

JAMES E. ROGAN
Director of the United States Patent and Trademark Office